Feb. 21, 1956 F. VOLLENSCHIER 2,735,895

LINE SELECTING MEANS IN AUTOMATIC TELEPHONE SYSTEMS

Filed Sept. 13, 1954 2 Sheets-Sheet 1

INVENTOR
F. VOLLENSCHIER
BY
Robert Harding Jr.
ATTORNEY

LINE SELECTING MEANS IN AUTOMATIC TELEPHONE SYSTEMS

Filed Sept. 13, 1954 2 Sheets-Sheet 2

INVENTOR
F. VOLLENSCHIER
BY Robert Harding Jr.
ATTORNEY

United States Patent Office 2,735,895
Patented Feb. 21, 1956

2,735,895

LINE SELECTING MEANS IN AUTOMATIC TELEPHONE SYSTEMS

Fritz Vollenschier, Stuttgart-Zuffenhausen, Germany, assignor to International Standard Electric Corporation, New York, N. Y., a corporation of Delaware Application September 13, 1954, Serial No. 455,562
Claims priority, application Germany September 19, 1953
3 Claims. (Cl. 179—18)

The invention pertains to line selecting means in automatic exchange systems, particularly telephone systems.

The setting of the outgoing dialing stage (line finder) and the end stage (final selector) are the only factors necessary for line selection. In the outgoing dialing stage initiation of a setting operation is given by the calling subscriber picking up the hand set and by the operation of the call relay connected thereto, which relay is assigned to that subscriber. Setting is effected in the incoming dial stage, insofar as connecting devices having indirect setting are used, over a register which picks up the dial impulses and conducts the control signals over an assigned marker to the final selector to be set.

The object of this invention pertains exclusively to connecting devices set indirectly, e. g. the selectors used, specifically the selector switches in the final stage are not set directly by dial impulses but merely by marking potentials.

In this case, connecting devices, for instance of the crossbar type, or so-called power selectors having a step-by-step drive or continual motor drive, can be used. In the detailed example given the above mentioned selector switches of the crossbar type are used as connecting devices.

The selector switches are equipped, as is already known, with setting devices which are commonly assigned to a group of connecting devices. In view of the fact that a common subscriber multiple is provided for the outgoing stage of preselection and the incoming final stage, it best suits the purpose to place the connecting devices for the stage of preselection and the final stage in a common multiple switch which is served by the same setting devices.

In order to decrease expenditures for the initiating devices for setting the stage of preselection and the final stage, a circuit arrangement, according to the invention, is suggested, so that in each case a common switching means is assigned to a plurality of subscribers, which, in connection with group relays, effects the setting of the corresponding connecting devices for the subscriber to be connected in each case. In such an arrangement the call relays have several windings which are circuited together in such a manner that the common setting equipment assigned to a group of connecting devices can be influenced as desired in the outgoing direction (from subscriber station) as well as in the incoming direction (for instance, over a register and a marker).

The above-mentioned and other features and objects of this invention and the manner of attaining them will become more apparent and the invention itself will be best understood by reference to the following description of an embodiment of the invention taken in conjunction with the accompanying drawings, in which.

Figure 1:
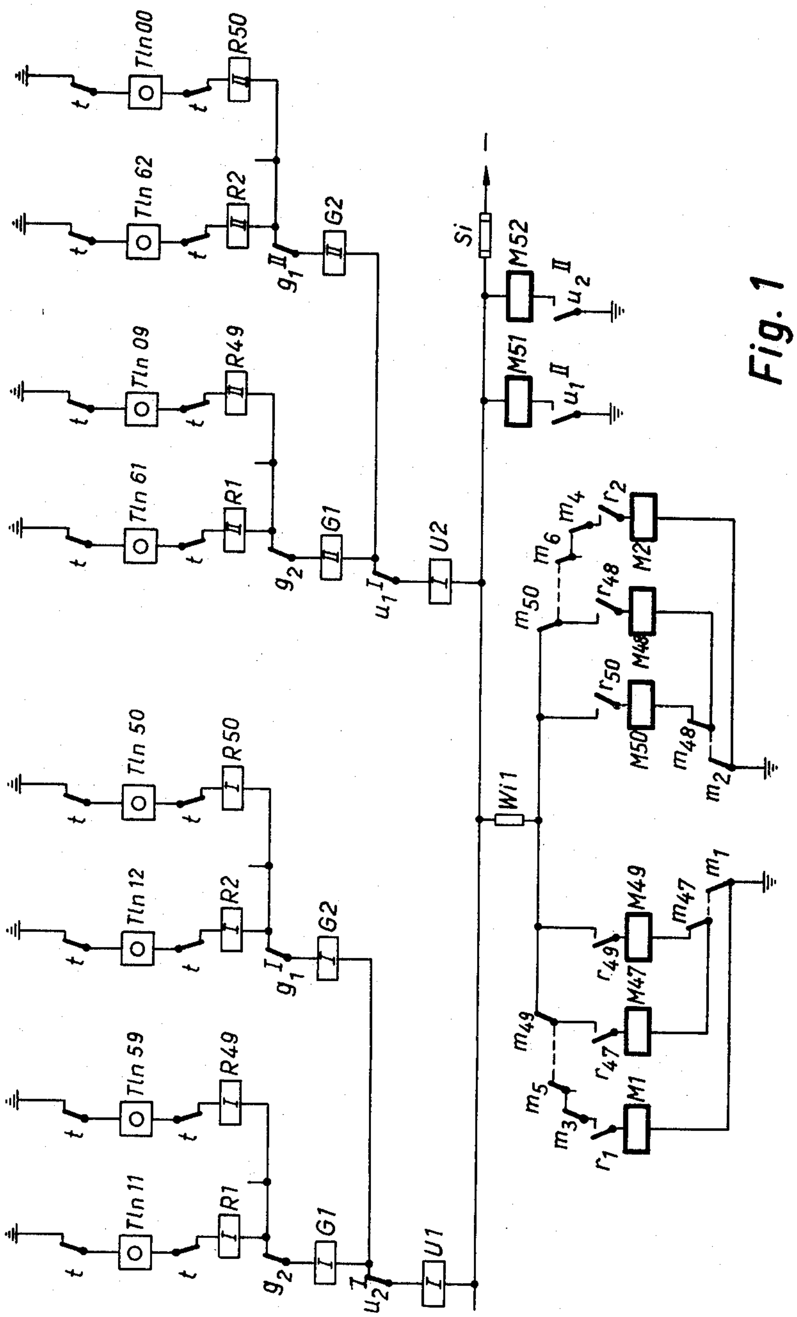
Fig. 1 shows the circuit arrangement for generating the call signals of the calling subscriber.

Fig. 1 shows the circuit arrangement for generating the call signals by the calling subscriber. In a plant for 100 subscriber connections the individual subscriber lines are divided into two groups of fifty lines each. When the digits in each denomination are numbered from 1 to 9 and 0, the first group contains the subscribers 11–50, and have calling relays R1–R50 with their windings I assigned to them. The same 50 calling relays have their windings II assigned to the subscribers 61–00. Each of these groups of 50 subscribers is divided into two sub-groups, e. g. the 25 subscribers having odd numbers (subscribers 11, 13, 15, 17–59) and the second 25 subscribers having the corresponding even numbers 12–50. The procedure is the same for the second group of 50 subscribers. Each of the first sub-groups of a subscriber fifty group has a common two winding group switch-off relay G1 assigned to it with the winding I of the relay in series with the first sub-group of the first group of lines and the winding II thereof in series with the first sub-group of the second group of lines. The second group of twenty-five of each group of fifty likewise has a group switch-off relay G2 assigned thereto. The purpose of this relay is to avoid simultaneous operation of two magnets assigned to one setting bar. Furthermore each subscriber group of fifty has a switch-over relay U assigned, e. g. relay U1 is assigned to the first group of fifty and U2 to the second group of fifty. These switch-over relays are used for the common setting equipment for switching over a group in order to save setting devices, because, when setting, two subscribers are marked which are distinguished from each other by an additional switch-over device (setting magnet M51 for the first group and M52 for the second group).

The circuit function for initiating a setting in outgoing calls is as follows:

If, for instance, subscriber 11 picks up the receiver, then the call relay R1 in the loop operates over its winding I with the group switch-off relay G1(I) and the switch-over relay U1(I) in series. The switch-over relay U1 disconnects the second group of fifty with its U1I contact, whereas the group switch-off relay G1 disconnects the second group of twenty-five of the first group of fifty with its contact *g*1I and the second group of twenty-five of the second group of fifty with its *g*1II contact, so that during that period the subscribers which have been disconnected cannot cause the initiation of a setting.

The call relay R1 switches on the setting magnet M1 of the common setting equipment with its contact *r*1. The contacts of the setting magnets M are arranged in a chain circuit so that in a period of time only one setting magnet can operate. The chain circuit is developed in such a manner that the odd numbered setting magnets M1, M3 . . . 47, M49 lie in one chain and the magnets M2, M4 . . . M48, M50 in a separate chain. Simultaneously contact *u*1II operates the switch-over magnet M51 which supplied the additional signal for marking the subscriber 11. In a manner not shown, a connecting device becomes effective which connects the subscriber, marked with electrical marking means by the setting magnets in conjunction with the bars assigned thereto, to an ougtoing connecting device.

If the subscriber 61 wants to initiate an outgoing call, then he too, operates the call relay R1, just like subscriber 11, however, not over winding I but over winding II. When a call is initiated, the group relay G1(II) and group relay U2 are operated in series with this call relay. The second group of fifty is marked by the group relay U2, and contact *u*2II operates the setting magnet M52 for switching over the group.

Figures 2, 3:
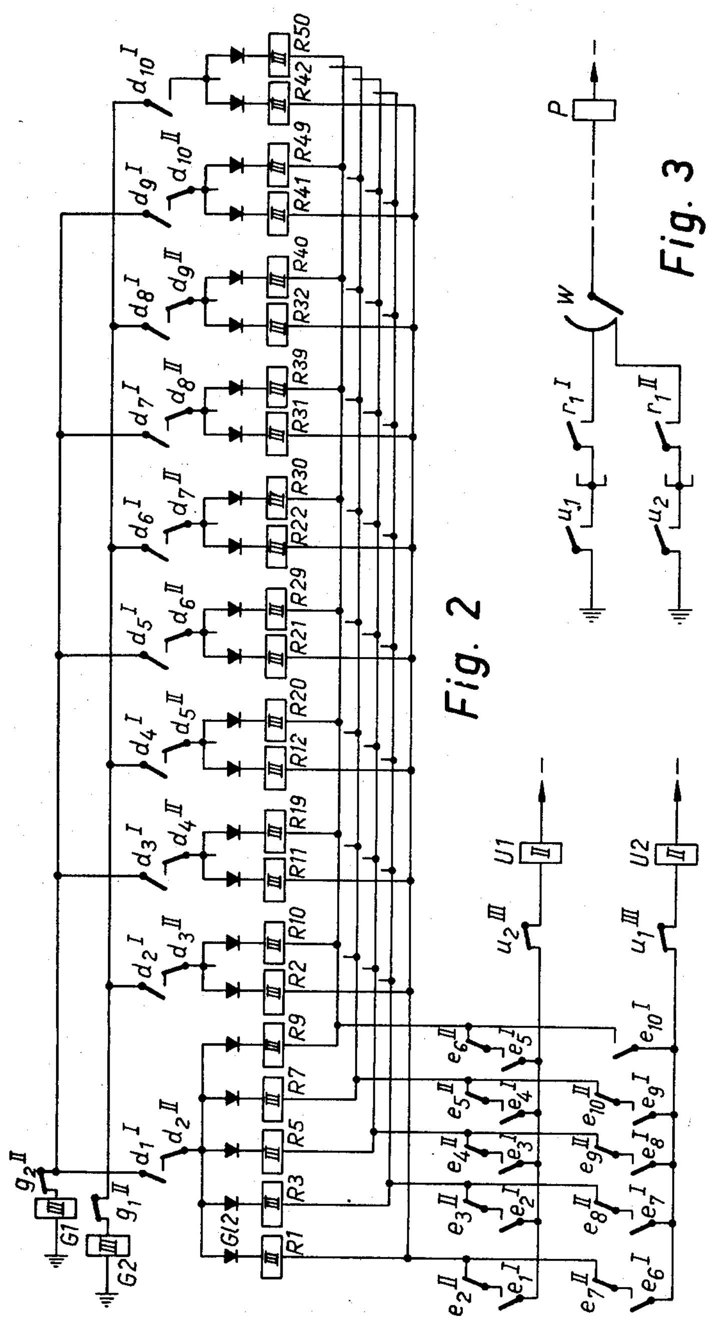
Fig. 2 shows an arrangement of call relays used for marking a called subscriber.
Fig. 3 shows an alternative selector arrangement.

Fig. 2 also shows an arrangement of call relays, which, however, is used for marking a called subscriber. The call relays used herefor are the same as those in Fig. 1 used for outgoing traffic. In this case the windings III are excited. The call relays are arranged parallel in ten groups of 5 relays per group. The developments of the groups is such that for instance the call relays R1, R3, R5, R7, R9 are combined in the first group. The second group contains the 5 relays R2–R10. The remaining eight groups are likewise developed for the remaining decades. By means of these fifty relays R, fifty different setting signals can be given and in connection with the switch-over relay U1 or U2 a subscriber out of a group of one hundred can be pin-pointed. The relays G1, G2, U1 and U2 used in this circuit arrangement are the same as those shown in Fig. 1, but other windings are used.

The contacts *d* (decade contacts) and *e* (digit contacts) are components of a register, not shown. This register operates in a known manner to store the called number and combinations of contacts *d* and *e* are then operated corresponding to the number stored. For instance, if the subscriber 12 is called, then the register picks up these digits and its impulse stores operate contact *d*1I and the digit contacts *e*2I and *e*2II. The following circuit is closed thereby:

+, relay G1(III), contacts *g*2II, *d*1I, *d*2II, rectifier G12, relay R3(III), contacts *e*3II, *e*2I, *u*2III, relay U1(II), —

The contact of the R3 relay affects magnet M3, as described in Fig. 1. In a corresponding manner, relays G and U operate. Due to the fact that the ten groups of each 5 call relays R(III) operate in common parallel circuits, the individual relays are decoupled by a rectifier.

As shown in Fig. 3, it is also possible to apply the subscriber circuit having a call relay for a plurality of subscribers, as described, to drive selectors. In this case the marking potential is connected to the hunting selector (W) over the contacts of the group—(U1 or U2) and call relays (R).

What is claimed is:

1. A circuit arrangement for marking subscribers' lines in automatic exchange systems comprising a plurality of subscribers' lines divided into groups and sub-groups, a plurality of call relays, each having a winding for each group of lines and each being assigned a plurality of said subscribers' lines including one line from each group, a plurality of group relays, there being one for each group of lines, a plurality of sub-group relays, there being one for each sub-group of lines, each having a winding for the corresponding sub-group in each group of lines, a source of potential, circuit means for making a series connection from each line in a sub-group, through a winding of the associated call relay, which winding is peculiar to the particular group of lines including said sub-group, through break contacts of sub-group relays other than that associated with said sub-group including said line, through the winding of the sub-group relay associated with said sub-group including said line, through break contacts of group relays other than that associated with said group including said line, through a winding of the group relay associated with said group including said line, and through said source of potential back to said line, a plurality of switch setting magnets, and means controlled by the joint operation of a calling relay and a group relay for operating a combination of said switch setting magnets to initiate the marking of a particular line.

2. A circuit arrangement for marking subscribers' lines in automatic exchange systems, as defined in claim 1, in which each call relay, each group relay, and each sub-group relay is provided with an additional winding to be used for marking a called line, said call relays being arranged in a plurality of different groups and sub-groups with respect to said additional windings, further comprising a group of first common terminals, there being one for each sub-group of said call relays, means for connecting one end of the additional windings of all call relays in each sub-group of relays to a different one of said first common terminals, a group of second common terminals, the number thereof being equal to the number of call relays in a sub-group, means for connecting the other ends of corresponding additional windings in all the sub-groups of call relays to a different second common terminal, a group of first switch means adapted to be selectively operated in accordance with a called number, there being one switch means for each first common terminal, means for connecting said first common terminals associated with each group of call relays to the additional winding of a different sub-group relay through break contacts of the other sub-group relays, a plurality of groups of second switch means adapted to be operated in accordance with a called number, the number of second switch means in each group being equal to the number of call relays in a sub-group, means for connecting the other ends of the additional windings of each sub-group of call relays to the additional winding of each group relay respectively through respective groups of second switch means and break contacts of the other group relays, means for connecting the source of potential between the additional windings of said group relays and said sub-group relays, and means determined by the joint operation of a call relay and a group relay for marking a particular called line.

3. A circuit arrangement for marking called subscribers' lines in automatic exchange systems comprising a plurality of subscribers' lines divided into groups and sub-groups, a plurality of call relays, the number of call relays being equal to the number of lines in a group and said call relays being arranged in different groups and sub-groups, a plurality of group relays, there being one for each group of lines, a plurality of sub-group relays, there being one for each sub-group of lines, a source of potential, a group of first common terminals, there being one for each sub-group of said call relays, means for connecting one end of the windings of all call relays in each sub-group of relays to a different one of said first common terminals, a group of second common terminals, the number thereof being equal to the number of call relays in a sub-group, means for connecting the other ends of the windings of corresponding call relays in all the sub-groups of said relays to a different second common terminal, a group of first switch means adapted to be selectively operated in accordance with a called number, there being one switch means for each first common terminal, means for connecting said first common terminals associated with each group of call relays to the winding of a different sub-group relay through break contacts of the other sub-group relays, a plurality of groups of second switch means adapted to be operated in accordance with a called number, the number of second switch means in each group being equal to the number of call relays in a sub-group, means for connecting the other ends of the windings of each sub-group of call relays to the winding of each group relay respectively through respective groups of second switch means and break contacts of the other group relays, means for connecting said source of potential between the windings of said group relays and the windings of said sub-group relays, and means determined by the joint operation of a call relay and a group relay for marking a particular line.

References Cited in the file of this patent

UNITED STATES PATENTS

| | | |
|---|---|---|
| 1,269,903 | Bygrave | June 18, 1918 |
| 2,478,453 | Blyholder | Aug. 9, 1949 |
| 2,542,079 | Grundin et al. | Feb. 20, 1951 |